(12) United States Patent
Byun et al.

(10) Patent No.: US 8,877,361 B2
(45) Date of Patent: *Nov. 4, 2014

(54) RECHARGEABLE BATTERY

(75) Inventors: Sang-Won Byun, Suwon-si (KR);
Yong-Sam Kim, Suwon-si (KR);
Hyo-Seob Kim, Suwon-si (KR);
Sung-Bae Kim, Suwon-si (KR);
Byung-Kyu Ahn, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 976 days.

This patent is subject to a terminal disclaimer.

(21) Appl. No.: 12/781,656

(22) Filed: May 17, 2010

(65) Prior Publication Data

US 2011/0052949 A1 Mar. 3, 2011

Related U.S. Application Data

(60) Provisional application No. 61/238,965, filed on Sep. 1, 2009.

(51) Int. Cl.

| H01M 2/00 | (2006.01) |
| H01M 2/14 | (2006.01) |
| H01M 2/34 | (2006.01) |
| H01M 2/04 | (2006.01) |
| H01M 10/0525 | (2010.01) |
| H01M 10/0565 | (2010.01) |

(52) U.S. Cl.
CPC .......... *H01M 2/043* (2013.01); *H01M 2200/20* (2013.01); *H01M 10/0525* (2013.01); *Y02E 60/12* (2013.01); *H01M 2/345* (2013.01); *H01M 2/34* (2013.01); *Y02T 10/7011* (2013.01); *H01M 10/0565* (2013.01); *H01M 2/0473* (2013.01)

USPC .............................. 429/61; 429/122; 429/163

(58) Field of Classification Search
CPC ............................ H01M 2/00; H01M 8/04246
USPC ........................................................... 429/61
See application file for complete search history.

(56) References Cited

U.S. PATENT DOCUMENTS 4,209,571 A * 6/1980 Bessett et al. ..................... 429/7
4,945,014 A 7/1990 Miyabayashi et al.

(Continued)

FOREIGN PATENT DOCUMENTS

| CN | 1395328 A | 2/2003 |
| CN | 1481039 A | 3/2004 |

(Continued)

OTHER PUBLICATIONS

Japan Office Action corresponding to 2010-170281, dated Aug. 28, 2012, 2 pages.

(Continued)

*Primary Examiner* — Matthew Merkling
(74) *Attorney, Agent, or Firm* — Christie, Parker & Hale, LLP

(57) ABSTRACT

A rechargeable battery includes an electrode assembly including a first electrode, a second electrode, and a separator between the first and second electrodes; a case housing the electrode assembly; and a cap assembly connected to the case. The cap assembly includes a first tab electrically connected to the first electrode, a second tab electrically connected to the second electrode, an deformable plate capable of electrically connecting the first tab and the second tab by being deformed due to a pressure increase, and an intermediate member formed between the first tab and the deformable plate.

12 Claims, 4 Drawing Sheets

(56) References Cited

U.S. PATENT DOCUMENTS

| | | | |
|---|---|---|---|
| 5,143,860 A | 9/1992 | Mitchell et al. | |
| 5,523,178 A | 6/1996 | Murakami et al. | |
| 5,707,756 A | 1/1998 | Inoue et al. | |
| 5,766,793 A | 6/1998 | Kameishi et al. | |
| 5,800,937 A * | 9/1998 | Decker et al. | 429/7 |
| 6,005,469 A * | 12/1999 | Kalapodis et al. | 337/140 |
| 6,083,792 A | 7/2000 | Sung | |
| 6,143,440 A | 11/2000 | Volz et al. | |
| 6,342,826 B1 * | 1/2002 | Quinn et al. | 337/300 |
| 6,399,237 B1 | 6/2002 | Souliac et al. | |
| 6,403,250 B1 | 6/2002 | Azema et al. | |
| 6,509,115 B2 | 1/2003 | Kim et al. | |
| 6,525,371 B2 | 2/2003 | Johnson et al. | |
| 6,562,493 B2 | 5/2003 | Tsukada et al. | |
| 6,642,110 B2 | 11/2003 | Jung et al. | |
| 6,753,104 B2 | 6/2004 | Kitoh | |
| 6,899,972 B2 | 5/2005 | Cho | |
| 7,351,496 B2 | 4/2008 | Nakanishi et al. | |
| 7,601,455 B2 | 10/2009 | Yoon | |
| 7,666,544 B2 | 2/2010 | Barrault et al. | |
| 8,043,737 B2 | 10/2011 | Kim | |
| 8,415,052 B2 | 4/2013 | Yoshida et al. | |
| 2002/0052080 A1 | 5/2002 | Lee | |
| 2002/0142543 A1 | 10/2002 | Lin et al. | |
| 2003/0013005 A1 | 1/2003 | Chang | |
| 2003/0027036 A1 | 2/2003 | Emori et al. | |
| 2003/0027044 A1 | 2/2003 | Asahina et al. | |
| 2003/0151868 A1 | 8/2003 | Inae et al. | |
| 2004/0092167 A1 | 5/2004 | Barrault et al. | |
| 2004/0126650 A1 | 7/2004 | Kim | |
| 2004/0170887 A1 | 9/2004 | Masumoto et al. | |
| 2004/0234842 A1 * | 11/2004 | Kawano et al. | 429/54 |
| 2005/0112455 A1 | 5/2005 | Marubayashi et al. | |
| 2005/0112456 A1 | 5/2005 | Kozu et al. | |
| 2005/0124133 A1 | 6/2005 | Tu | |
| 2005/0269622 A1 | 12/2005 | Klinger et al. | |
| 2006/0099500 A1 | 5/2006 | Jeon | |
| 2007/0077706 A1 | 4/2007 | Orlowski et al. | |
| 2007/0122691 A1 | 5/2007 | Lee et al. | |
| 2007/0166605 A1 | 7/2007 | Meguro et al. | |
| 2007/0182020 A1 | 8/2007 | Trezza et al. | |
| 2007/0212595 A1 | 9/2007 | Kim et al. | |
| 2007/0269711 A1 | 11/2007 | Meguro et al. | |
| 2008/0070067 A1 | 3/2008 | Jang et al. | |
| 2008/0145748 A1 | 6/2008 | Jung | |
| 2008/0213657 A1 | 9/2008 | Qi et al. | |
| 2009/0087733 A1 | 4/2009 | Yoon et al. | |
| 2009/0305126 A1 | 12/2009 | Choi et al. | |
| 2010/0028762 A1 | 2/2010 | Yokoyama et al. | |
| 2010/0081048 A1 | 4/2010 | Nansaka et al. | |
| 2010/0136388 A1 | 6/2010 | Kim et al. | |
| 2010/0167107 A1 | 7/2010 | Byun et al. | |
| 2010/0227205 A1 | 9/2010 | Byun et al. | |
| 2010/0279156 A1 | 11/2010 | Kim et al. | |
| 2010/0291421 A1 | 11/2010 | Byun et al. | |
| 2011/0039136 A1 | 2/2011 | Byun et al. | |
| 2011/0135976 A1 | 6/2011 | Byun | |
| 2011/0136004 A1 | 6/2011 | Kwak et al. | |
| 2011/0177387 A1 | 7/2011 | Byun et al. | |
| 2011/0183193 A1 | 7/2011 | Byun et al. | |
| 2011/0244280 A1 | 10/2011 | Byun et al. | |

FOREIGN PATENT DOCUMENTS

| | | |
|---|---|---|
| EP | 0 313 405 A1 | 4/1989 |
| EP | 1 076 350 A2 | 2/2001 |
| EP | 1 717 886 A2 | 11/2006 |
| EP | 1 901 369 A1 | 3/2008 |
| EP | 2 284 932 A1 | 2/2011 |
| EP | 2 287 942 A1 | 2/2011 |
| EP | 2 299 512 A1 | 3/2011 |
| EP | 2 333 871 A1 | 6/2011 |
| EP | 2 348 558 A1 | 7/2011 |
| EP | 2 357 685 A1 | 8/2011 |
| JP | 05-062664 | 3/1993 |
| JP | 05-251290 | 9/1993 |
| JP | 05-275088 | 10/1993 |
| JP | 06-290767 | 10/1994 |
| JP | 07-037572 | 2/1995 |
| JP | 07-201372 | 8/1995 |
| JP | 08-050920 | 2/1996 |
| JP | 08-185850 | 7/1996 |
| JP | 9-106804 | 4/1997 |
| JP | 09-106804 | 4/1997 |
| JP | 10-074500 | 3/1998 |
| JP | 10-188946 | 7/1998 |
| JP | 10-208725 | 8/1998 |
| JP | 10-326610 | 12/1998 |
| JP | 11-007931 | 1/1999 |
| JP | 11-040203 | 2/1999 |
| JP | 11-273651 | 10/1999 |
| JP | 11-307076 | 11/1999 |
| JP | 2000-082457 | 3/2000 |
| JP | 2000-182598 | 6/2000 |
| JP | 2001-202946 | 7/2001 |
| JP | 2001-357834 | 12/2001 |
| JP | 2002-216743 | 8/2002 |
| JP | 2003-051303 | 2/2003 |
| JP | 2003-051304 | 2/2003 |
| JP | 2003-092103 | 3/2003 |
| JP | 2003-178745 | 6/2003 |
| JP | 2003-197178 | 7/2003 |
| JP | 2003-223886 | 8/2003 |
| JP | 2003-308815 | 10/2003 |
| JP | 2004-022477 | 1/2004 |
| JP | 2004-087194 | 3/2004 |
| JP | 2004-521459 | 7/2004 |
| JP | 2004-273139 | 9/2004 |
| JP | 2004-319463 | 11/2004 |
| JP | 2005-032477 | 2/2005 |
| JP | 2005-044626 | 2/2005 |
| JP | 2005-166584 | 6/2005 |
| JP | 2006-012602 | 1/2006 |
| JP | 2006-147180 | 6/2006 |
| JP | 2008-27668 | 2/2008 |
| JP | 2008-177084 | 7/2008 |
| JP | 2008-186591 | 8/2008 |
| JP | 2008-218132 | 9/2008 |
| JP | 2009-105075 | 5/2009 |
| JP | 2010-033777 | 2/2010 |
| JP | 2010-097822 | 4/2010 |
| JP | 2011-018645 | 1/2011 |
| JP | 2011-154991 | 8/2011 |
| JP | 2011-210717 | 10/2011 |
| KR | 20-1999-0031054 U | 7/1999 |
| KR | 10-2001-0011900 | 2/2001 |
| KR | 10-2001-0021236 | 3/2001 |
| KR | 10-2006-0020211 | 3/2006 |
| KR | 1020060039955 A | 5/2006 |
| KR | 10-0693115 B1 | 3/2007 |
| KR | 10-2007-0122471 | 12/2007 |
| KR | 10-0870349 B1 | 11/2008 |
| KR | 10-2010-0036164 | 4/2010 |
| KR | 10-2010-0052885 | 5/2010 |
| KR | 10-2010-0062886 | 6/2010 |
| KR | 10-2010-0076699 | 7/2010 |
| KR | 10-2010-0088021 | 8/2010 |
| KR | 10-2010-0099983 | 9/2010 |
| KR | 10-2010-0123598 | 11/2010 |
| KR | 10-2011-0005197 | 1/2011 |
| KR | 10-2011-0030043 | 3/2011 |
| KR | 10-2011-0136166 | 12/2011 |
| WO | WO 02/071510 A1 | 9/2002 |
| WO | WO 2007/126243 A1 | 11/2007 |

OTHER PUBLICATIONS

Full English Machine Translation of Publication No. JP 2004-273139, dated Sep. 30, 2004, 24 pages.
Full English Machine Translation of Publication No. JP 2008-027668, dated Feb. 7, 2008, 13 pages.
KIPO Notice of Allowance dated Oct. 26, 2012, for corresponding Korean Patent application 10-2010-0052011, (5 pages).

(56) References Cited

OTHER PUBLICATIONS

Patent Abstracts of Japan, and English machine translation of Japanese Publication 10-326610, previously submitted in an IDS dated Sep. 9, 2010, (10 pages).
Patent Abstracts of Japan, and English machine translation of Japanese Publication 2000-182598 listed above, (21 pages).
European Office action dated Jul. 27, 2012, for corresponding European Patent application 10164550.5, (5 pages).
European Search Report dated Aug. 19, 2010, for corresponding European Patent application 10164550.6, noting listed references in this IDS.
EPO Office action dated Aug. 17, 2011 for corresponding EP Patent Application No. 10 164 550.5, 8 pages.
Examination Communication issued Mar. 22, 2012 in corresponding European Patent Application No. 10 1164 550.5, 4pp.
European Search Report dated Mar. 7, 2011, for corresponding European Patent application 10164550.5.
SIPO Office action dated Jan. 22, 2013, for corresponding Chinese Patent application 201010220632.0, w/English translation, (20 pages).
EPO Search Report dated Oct. 13, 2010 for European Patent application 10169791, (6 pages).
EPO Office action dated Apr. 21, 2011 for European Patent application 10169791, (6 pages).
KIPO Office action dated Jan. 17, 2012 for Korean Patent application 10-2010-0068019, (9 pages).
KIPO Office action dated Mar. 19, 2012 for Korean Patent application 10-2010-0062270, (5 pages).
EPO Office action dated Feb. 8, 2011 for European Patent application 10168526.1, (4 pages).
EPO Search Report dated Aug. 16, 2010 for European Patent application 101685263.1, (6 pages).
EPO Search Report dated Feb. 29, 2012 for European Patent application 11165265.7, (5 pages).
KIPO Office action dated Aug. 13, 2012 for Korean Patent application 10-2011-0036267, (4 pages).
JPO Office action dated Jun. 4, 2013 for Japanese Patent application 2011-170959, (3 pages).
EPO Search Report dated Sep. 28, 2012 for European Patent application 12179697.3, (6 pages).
EPO Search Report dated Dec. 20, 2012 for European Patent application 12178835.0, (6 pages).
EPO Search Report dated Oct. 2, 2012 for European Patent application 11178263.7, (7 pages).
EPO Search Report dated Aug. 19, 2010 for European Patent application 10167890.2, (7 pages).
JPO Office action dated Feb. 5, 2013, for Japanese Patent application 2010-154142, (2 pages).
SIPO Office action dated Apr. 12, 2013, with English translation, for Chinese Patent application 201010135715.X, (20 pages).
SIPO Office action dated Aug. 6, 2013, with English translation for Chinese Patent application 201010135715.X, (20 pages).
SIPO Office action dated Jul. 15, 2013, with English translation for Chinese Patent application 201010220632.0, (10 pages).
U.S. Office action dated May 6, 2013, for cross reference U.S. Appl. No. 13/077,640, (17 pages).
U.S. Office action dated Aug. 17, 2010, for cross reference U.S. Appl. No. 12/626,582, (11 pages).
U.S. Office action dated Nov. 23, 2010, for cross reference U.S. Appl. No. 12/626,582, (10 pages).
Patent Abstracts of Japan, and English machine translation of Japanese Publication 05-062664, dated Mar. 12, 1993, (11 pages).
Patent Abstracts of Japan, and English machine translation of Japanese Publication 06-290767, dated Oct. 18, 1994, (13 pages).
Patent Abstracts of Japan, and English machine translation of Japanese Publication 07-037572, dated Feb. 7, 1995, (5 pages).
Patent Abstracts of Japan, and English machine translation of Japanese Publication 10-208725, Aug. 7, 1998, (10 pages).
Patent Abstracts of Japan, and English machine translation of Japanese Publication 11-273651, Oct. 8, 1999, (12 pages).
Patent Abstracts of Japan, and English machine translation of Japanese Publication 2000-082457, Mar. 21, 2000, (13 pages).
Patent Abstracts of Japan, and English machine translation of Japanese Publication 2004-022477, Jan. 22, 2004, (7 pages).
Patent Abstracts of Japan, and English machine translation of Japanese Publication 2004-087194, Mar. 18, 2004, (10 pages).
Patent Abstracts of Japan, and English machine translation of Japanese Publication 2005-044626, Feb. 17, 2005, (11 pages).
Patent Abstracts of Japan, and English machine translation of Japanese Publication 2008-186591, Aug. 14, 2008, (14 pages).
Patent Abstracts of Japan, and English machine translation of Japanese Publication 2008-218132, Sep. 18, 2008, (10 pages).
Patent Abstracts of Japan, and English machine translation of Japanese Publication 2010-033777, Feb. 12, 2010, (16 pages).
U.S. Notice of Allowance dated Sep. 23, 2013, for cross reference U.S. Appl. No. 13/210,124, (15 pages).
EPO Office action dated Apr. 20, 2011 for European Patent application 10167890.2, (6 pages).
KIPO Letters Patent dated Dec. 15, 2011 for Korean Patent application 10-2009-0116065, (11 pages).
SIPO Office action dated Aug. 27, 2012, with English translation, for Chinese application 201010135715.X, (16 pages).
KIPO Office action dated Jun. 18, 2012 for Korean Patent application 10-2011-0003951, (4 pages).
KIPO Office action dated Oct. 8, 2012, for Korean Patent application 10-2011-0050510, (4 pages).
KIPO Office action dated Apr. 4, 2012, for Korean Patent application 10-2010-0062874, (5 pages).
KIPO Notice of Allowance dated Dec. 4, 2012, for Korean Patent application 10-2011-0003951, (5 pages).
KIPO Notice of Allowance dated Mar. 27, 2013, for Korean Patent application 10-2011-0050510, (5 pages).
EPO Search Report dated Dec. 14, 2012 for European Patent application 12160354.2, (5 pages).
EPO Search Report dated Sep. 29, 2011 for European Patent application 11169286.9, (5 pages).
EPO Office action dated Jul. 19, 2011 for European Patent application 10170406.2 (3 pages).
JPO Office action dated Apr. 30, 2013, for Japanese Patent application 2011-115662, (2 pages).
JPO Office action dated Sep. 24, 2013, for Japanese Patent application 2011-170959, (3 pages).
SIPO Office action dated Dec. 4, 2013, with English translation for Chinese Patent application 201110207662.2, (20 pages).
Korean Patent Abstracts for Korean Publication 10-2008-0084416 dated Sep. 19, 2008, corresponding to Korean Patent 10-0870349 dated Nov. 25, 2008, listed above.
U.S. Office action dated Jun. 21, 2013, for cross reference U.S. Appl. No. 13/137,460, (25 pages).
U.S. Office action dated Dec. 21, 2012, for cross reference U.S. Appl. No. 12/656,085, (28 pages).
Patent Abstracts of Japan, and English machine translation of Japanese Publication 05-251290, dated, (5 pages).
Patent Abstracts of Japan, and English machine translation of Japanese Publication 05-257088, dated, (6 pages).
Patent Abstracts of Japan, and English machine translation of Japanese Publication 07-201372, dated Aug. 4, 1995, (5 pages).
Patent Abstracts of Japan, and English machine translation of Japanese Publication 08-050920, dated, (14 pages).
Patent Abstracts of Japan, and English machine translation of Japanese Publication 08-185850, dated, (11 pages), also Corresponds to U.S. Patent 6,753,104 listed above.
Patent Abstracts of Japan, and English machine translation of Japanese Publication 10-188946, dated , (8 pages), also Corresponds to U.S. Patent 7,666,544 listed above.
Patent Abstracts of Japan, and English machine translation of Japanese Publication 11-307076, dated, (6 pages).
Patent Abstracts of Japan, and English machine translation of Japanese Publication 2001-202946, dated , (8 pages).
Patent Abstracts of Japan, and English machine translation of Japanese Publication 2001-357834, dated , (15 pages).
Patent Abstracts of Japan, and English machine translation of Japanese Publication 2002-216743, dated, (10 pages).

(56) References Cited

OTHER PUBLICATIONS

Patent Abstracts of Japan, and English machine translation of Japanese Publication 2003-051304, dated , (19 pages).
Patent Abstracts of Japan, and English machine translation of Japanese Publication 2003-092103, dated , (18 pages).
Patent Abstracts of Japan, and English machine translation of Japanese Publication 2003-197178 dated Jul. 11, 2003, (12 pages).
Patent Abstracts of Japan, and English machine translation of Japanese Publication 2003-223886, dated, (10 pages).
Patent Abstracts of Japan, and English machine translation of Japanese Publication 2005-032477, dated, (21 pages).
Patent Abstracts of Japan, and English machine translation of Japanese Publication 2006-012602, dated, (10 pages).
Patent Abstracts of Japan, and English machine translation of Japanese Publication 2008-177084, dated, (11 pages).
Patent Abstracts of Japan, and English machine translation of Japanese Publication 2009-105075, dated, (10 pages).
Patent Abstracts of Japan, and English machine translation of Japanese Publication 2010-097822, dated, (24 pages).
Patent Abstracts of Japan, and English machine translation of Japanese Publication 2011-018645, dated Jan. 27, 2011, (15 pages).
SIPO Office action dated May 19, 2014, with English translation, for corresponding Chinese Patent application 201110207662.2, (16 pages).
U.S. Office action dated Oct. 1, 2013, for cross reference U.S. Appl. No. 13/396,463, (15 pages).
U.S. Office action dated Oct. 8, 2013, for cross reference U.S. Appl. No. 13/563,028, (16 pages).
U.S. Office action dated Nov. 21, 2013, for cross reference U.S. Appl. No. 13/077,640, (16 pages).
U.S. Office action dated Jun. 4, 2014, for cross reference U.S. Appl. No. 13/077,640, (25 pages).
U.S. Office action dated Apr. 8, 2014, for cross reference U.S. Appl. No 13/396,463, (7 pages).
U.S. Notice of Allowance dated Apr. 30, 2014, for cross reference U.S. Appl. No. 13/563,028, (27 pages).
U.S. Office action dated May 20, 2014, for cross reference U.S. Appl. No. 12/626,582, (26 pages).
U.S. Office action dated May 6, 2011, for cross reference U.S. Appl. No. 12/634,000, (9 pages).
U.S. Office action dated Sep. 2, 2011, for cross reference U.S. Appl. No. 12/634,000, (14 pages).
U.S. Office action dated Jan. 9, 2012, for cross reference U.S. Appl. No. 12/634,000, (11 pages).
U.S. Notice of Allowance dated Apr. 13, 2012, for cross reference U.S. Appl. No. 12/634,000, (10 pages).

* cited by examiner

RECHARGEABLE BATTERY

CROSS-REFERENCE TO RELATED APPLICATIONS

This application claims priority to and the benefit of U.S. Provisional Application No. 61/238,965, filed on Sep. 1, 2009 in the United States Patent and Trademark Office, the entire content of which is incorporated herein by reference.

BACKGROUND

1. Field

This following description relates to a rechargeable battery.

2. Description of the Related Art

A rechargeable battery can be recharged and discharged, unlike a primary battery that is not designed to be recharged. A low capacity rechargeable battery is used for a small portable electronic device such as a mobile phone, a laptop computer, and a camcorder, and a large capacity rechargeable battery is used as a power source for driving a motor such as for a hybrid vehicle.

A large capacity high power rechargeable battery with high energy density using a non-aqueous electrolyte has been developed. The rechargeable battery is formed with a large capacity high power rechargeable battery module by coupling a plurality of rechargeable batteries in series or in parallel in order to use it to drive a device, for example, a motor such as a motor in an electric vehicle requiring a large amount of electric power.

Further, a high power rechargeable battery is generally formed with a plurality of rechargeable batteries that are coupled in series or in parallel. The rechargeable battery may have a cylindrical shape or a prismatic shape.

The prismatic rechargeable battery includes an electrode assembly including a separator between a positive electrode and a negative electrode, a case having a space for containing the electrode assembly, a cap plate that seals the case and has a terminal hole into which a terminal is inserted, and a terminal that is electrically connected with the electrode assembly and inserted in the terminal hole of the cap plate, the terminal protruding out of the case.

When excessive heat is generated inside a rechargeable battery, or electrolyte solution is decomposed, increasing the internal pressure, the battery may explode or combust. Particularly, in a prismatic battery, due to its unique terminal structure, it is difficult to have a structure that cuts off or discharges current, especially when compared to a cylindrical battery.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed toward a rechargeable battery having improved safety.

According to an exemplary embodiment of the present invention, a rechargeable battery includes an electrode assembly including a first electrode, a second electrode, and a separator between the first electrode and the second electrode, a case containing the electrode assembly, and a cap assembly coupled to the case. The cap assembly includes a cap plate, a first tab electrically coupled to the first electrode, a deformable plate, and an intermediate member attached to the deformable plate.

The deformable plate may be configured to cause the intermediate member to form an electrical path between the first electrode and the second electrode when deformed. The deformable plate may be configured to deform in response to an increase in pressure inside the case and cause the intermediate member to electrically contact the first tab to electrically couple the first electrode and the second electrode.

The material of the intermediate member may have a higher melting point than a material of the deformable plate. The intermediate member may include a material selected from the group consisting of aluminum, stainless steel, and copper, and the deformable plate may include a material selected from the group consisting of aluminum and stainless steel. The intermediate member may have a thickness greater than a thickness of the deformable plate.

The intermediate member may be affixed to the deformable plate by a connecting bar. The intermediate member may be between the first tab and the electrode assembly.

The cap assembly may also include a second tab electrically coupled to the second electrode, and the connecting bar may be between an end of the first tab and an end of the second tab.

The intermediate member may be between the first tab and the deformable plate. The first tab may be inside the case. The first tab may be outside the case.

The electrode assembly may also include a first lead tab electrically connected to the first electrode, and the first tab may be affixed to the first lead tab. The deformable plate may be welded to the cap plate.

The cap assembly may also include an insulating member between the first tab and the cap plate for electrically insulating the first tab from the cap plate. The first tab may have an opening through which a first terminal electrically coupled to the first electrode protrudes from an interior to an exterior of the case.

The second electrode may be electrically coupled to the cap plate. The deformable plate may be curved to protrude toward an inside of the case. The cap assembly may also include a first terminal, a second terminal, and a second tab. The first tab may be electrically connected to the first terminal, the second tab may be electrically connected to the second terminal, and the deformable plate may be configured to deform in response to an increase in pressure inside the case, causing the intermediate member to electrically connect the first tab and the second tab.

Figure 1:
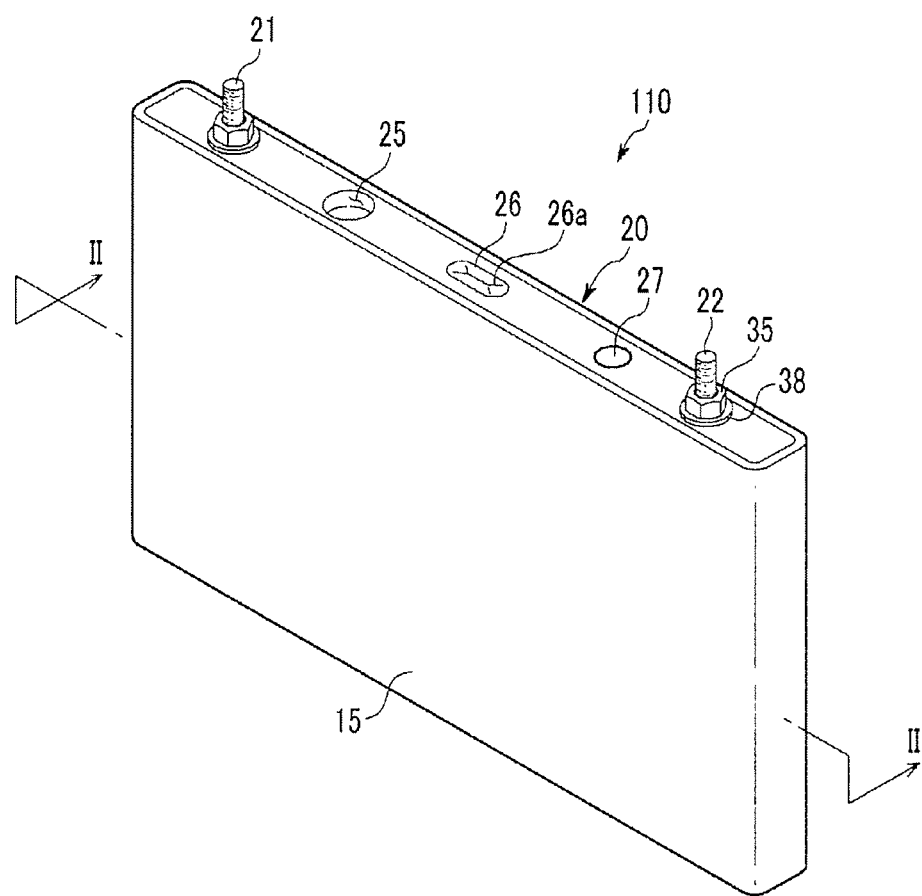
FIG. 1 is a perspective view of a rechargeable battery according to a first embodiment of the present invention.

| Description of Reference Numerals Indicating Some of the Elements in the Drawings ||
| --- | --- |
| 110, 120, 130: rechargeable battery | 10: electrode assembly |
| 11: first electrode | 12: second electrode |
| 13: separator | 15: case |

-continued

Description of Reference Numerals Indicating Some of the Elements in the Drawings

| 20, 50, 60: cap assembly | 21: first terminal |
| 22: second terminal | 25: short-circuit hole |
| 28: cap plate | 34: lower insulating member |
| 36: conductive connection tab | 38: upper gasket |
| 39: lower gasket | 41, 51, 61: deformable plate |
| 41a: deformable plate edge | 41b: deformation portion |
| 42, 52, 67: first tab | 46, 56: second tab |
| 43, 53, 63: intermediate member | 47: connecting bar |
| 67a: vent | 68: upper insulating member |

DETAILED DESCRIPTION

Hereinafter, exemplary embodiments of the present invention will be described more fully with reference to the accompanying drawings, in which exemplary embodiments of the invention are shown. As those skilled in the art would realize, the described embodiments may be modified in various different ways, all without departing from the spirit or scope of the present invention. In the specification and drawings, like reference numerals designate like elements.

As described herein, the term 'deformable plate' refers to plate that is capable of being deformed in response to a pressure increase. The shape of the plate is not limited to the described embodiments, but rather, any suitable plate shape may be used.

Figure 2:
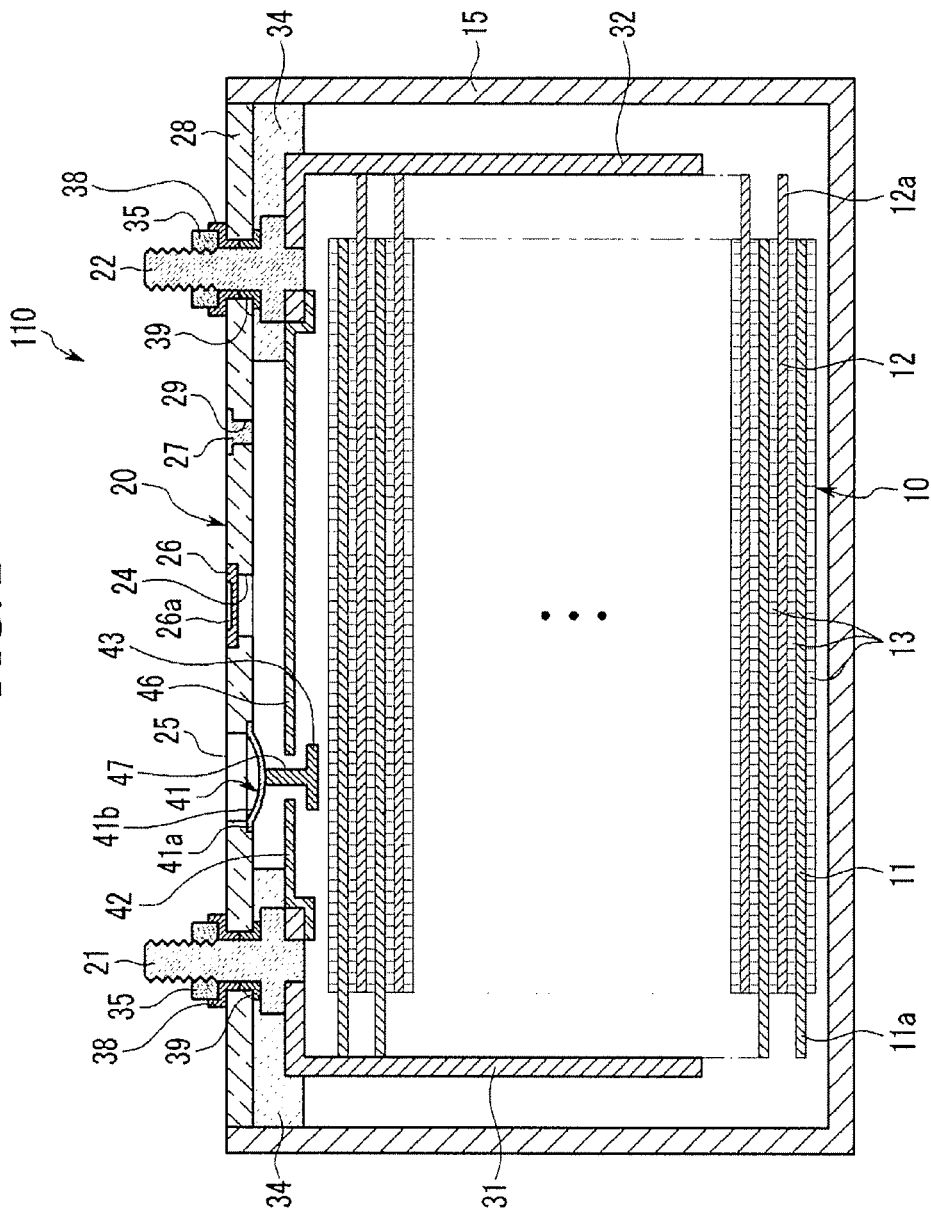
FIG. 2 is a cross-sectional view of the rechargeable battery taken along the line II-II of FIG. 1.

FIG. 1 is a perspective view of a rechargeable battery according to a first exemplary embodiment of the present invention, and FIG. 2 is a cross-sectional view of the rechargeable battery taken along the line II-II of FIG. 1.

Referring to FIGS. 1 and 2, the rechargeable battery 110 according to the embodiment of the present invention includes a electrode assembly 10 that is wound with an insulating separator 13 between a first electrode 11 and a second electrode 12, a case 15 in which the electrode assembly 10 is contained, and a cap assembly 20 coupled to an opening of the case 15.

The rechargeable battery 110 according to the first embodiment is a prismatic lithium ion rechargeable battery. However, the present invention is not limited thereto, and the present invention may be applied to various types of batteries such as a lithium polymer battery or a cylindrical lithium ion secondary battery.

The first electrode 11 and the second electrode 12 include coated regions, where active material is coated on a current collector formed of a thin plate of a metal foil, and uncoated regions 11a and 12a, where the active material is not coated. According to the present exemplary embodiment, the first electrode 11 is a positive electrode, and the second electrode 12 is a negative electrode. However, the present invention is not limited thereto. Therefore, the first electrode 11 may be a negative electrode, and the second electrode 12 may be a positive electrode.

The uncoated region 11a of first electrode is formed on one side end of the first electrode 11 along a length direction of the first electrode 11, and the uncoated region 12a of second electrode is formed on the other side end of the second electrode (e.g., opposite the uncoated region 11a of the first electrode) 12 along a length direction of the second electrode 12. The first electrode 11, the second electrode 12, and the separator 13 are then spirally wound.

The electrode assembly 10 may be provided by alternatively laminating the first electrode 11 and the second electrode 12 with a separator 13 therebetween, each of the first electrode and the second electrode formed of a plurality of sheets, such as in a lithium polymer battery.

A case 15 is approximately cuboid and has an opening at one side. The cap assembly 20 includes a cap plate 28 covering the opening of case 15, a first terminal 21 electrically connected to the first electrode 11, a second terminal 22 electrically connected to the second electrode 12, a first tab 42 electrically connected with the first terminal 21, a second tab 46 electrically connected with the second terminal 22, and a deformable plate 41 (e.g., deformable plate) fixed on the cap plate 28.

The cap plate 28 is a thin plate and is coupled to the opening of case 15. A sealing plug 27 is provided in an electrolyte injection opening 29 of the cap plate 28. The cap plate includes a vent plate 26 provided in the vent hole 24, the vent plate having a notch 26a or thinner portion that is adapted to be opened under a set or predetermined pressure.

The first terminal 21 and the second terminal 22 extend through the cap plate 28, and each have a supported flange under the cap plate 28. The circumference of the protruding first and second terminals 21, 22 are threaded, like a screw. In addition, nuts 35 that support the terminals 21 and 22 at upper portions thereof are fastened to respective terminals 21 and 22.

An upper gasket 38 and a lower gasket 39 are provided between the cap plate 28 and each of the first terminal 21 and the second terminal 22 to seal and insulate between the terminals 21 and 22 and the cap plate 28.

The first terminal 21 is electrically connected to the first electrode 11 through the first lead tab 31, and the second terminal 22 is electrically connected to the second electrode 12 through the second lead tab 32.

A lower insulating member 34 is located beneath the cap plate 28, and the lower end of terminals 21 and 22 and the upper end of lead tabs 31 and 32 are inserted in the lower insulating member 34.

The first lead tab 31 electrically connects the first terminal 21 to the first electrode 11, and the second lead tab 32 electrically connects the second terminal 22 to the second electrode 12.

The first tab 42 has a plate shape and is located under the cap plate 28. One side terminal end of the first tab 42 is welded and fixed on the first lead tab 31, and the other side of the first tab 42 extends to below the deformable plate 41.

According to the present exemplary embodiment, the first tab 42 is welded and fixed on the first lead tab 31. However, in other embodiments of the present invention, the first tab 42 may be welded and fixed on the first terminal 21, or alternatively, welded and fixed on both the first lead tab 31 and the first terminal 21.

The second tab 46 has a plate shape and is located under the cap plate 28. One side terminal end of the second tab 46 is welded and fixed on the second lead tab 32, and the other side of the second tab 46 extends to below the deformable plate 41.

There is a space between an end of the first tab 42 and the second tab 46, thus the two tabs 42, 46 are not electrically connected.

A short-circuit hole 25 (e.g., short circuit opening) is formed in a cap plate 28, and the deformable plate 41 is formed or attached under the short-circuit hole 25.

The deformable plate 41 is welded and joined to the cap plate 28 and includes a deformable plate edge 41a (e.g., edge part) having a flat ring shape and a deformation portion 41b (e.g., part of the deformable plate that deforms) that is formed inside the deformable plate edge 41a and protrudes curvedly (e.g., in an arch) toward the interior of the battery, or toward electrode assembly 10.

An intermediate member 43 is mounted under the deformable plate 41, and the intermediate member 43 is connected to the deformable plate 41 through a connecting bar 47.

The intermediate member 43 is formed to be thicker than the deformable plate 41, and to have an approximate disc shape. The thickness of the deformable plate could be from 0.3 mm to 0.5 mm, while the thickness of the intermediate member 43 could be from 1 mm to 2 mm. However, the present invention is not limited to these specific thicknesses. The connecting bar 47 passes between the tabs 42 and 46 and extends below them. The intermediate member 43 is fixed on the lower end of the connecting bar 47. Thereby, the intermediate member 43 is below the tabs 42 and 46. Furthermore, the terminal end of the first tab 42 and the terminal end of the second tab 46 are between the intermediate member 43 and the deformable plate 41.

When the internal pressure of rechargeable battery 110 is excessively increased, the deformation portion 41b, which normally protrudes downward is inverted upward. Thereby, the intermediate member 43 is raised, electrically connecting the first tab 42 and the second tab 46.

The deformable plate 41 is designed to invert at a set or predetermined pressure, so the thickness of the deformable plate 41 is limited. Accordingly, if the deformable plate 41 directly contacts the tabs 42 and 46, the deformable plate 41 may be fused to the tabs 42 and 46, due to the excessive current passed there through upon a short-current. Thereby, the short-circuit could be stopped.

However, according to the present exemplary embodiment, the intermediate member 43 contacts the tabs 42 and 46. As the intermediate member is relatively thick, it is possible to prevent the stop of a short-circuit state, even if excessive current is passed through the intermediate member 43 when the short-circuit occurs.

An elastic member, such as a spring, continuously receives pressure during normal operation of a battery, and the elasticity of the elastic member may be decreased or eliminated after a period of time. In order to improve the long term safety of the rechargeable battery 110, the elastic member should be capable of operating under a predetermined or set pressure without losing elasticity during an expected life of the rechargeable battery 110. If the elastic member receives pressure during normal operation of the battery, the elasticity of the elastic member is reduced or eliminated, and thus it may not properly operate during the expected life of the rechargeable battery 110, thereby causing a safety problem. However, according to the present exemplary embodiment, the elastic member, i.e., the deformable plate 41, is capable of operating without being deformed under a predetermined or set pressure during normal operation of the battery, so that the deformable plate 41 may operate under the predetermined pressure for a relatively long period of time.

Figure 3:
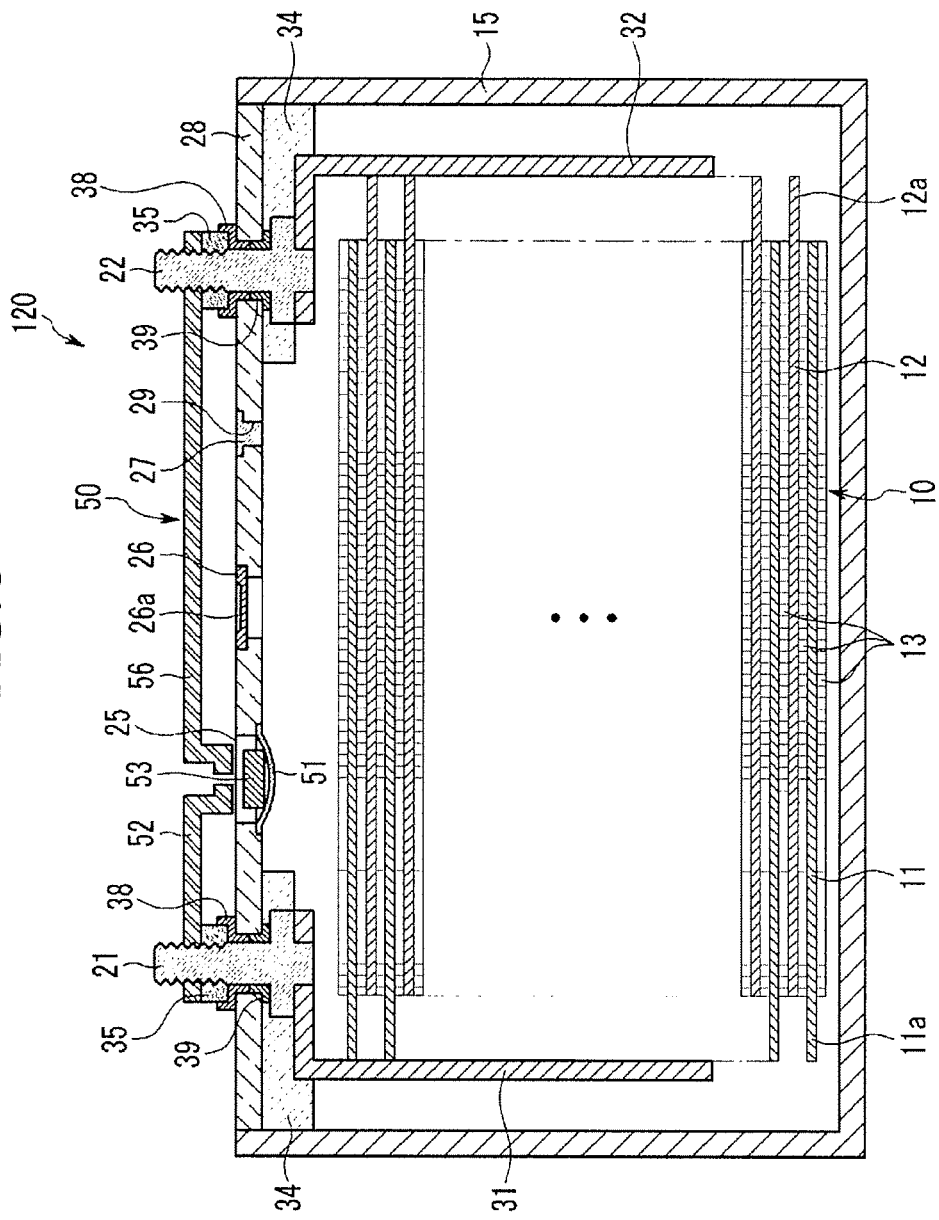
FIG. 3 is a cross-sectional view of a rechargeable battery according to a second embodiment of the present invention.

FIG. 3 is a cross-sectional view of a rechargeable battery according to a second embodiment of the present invention.

Referring to FIG. 3, the rechargeable battery 120 according to another embodiment has generally the same structure as in the rechargeable battery cell according to the first embodiment, except for the structure of tabs and intermediate member, and therefore, structures that are similar may not be further described.

As shown in FIG. 3, the rechargeable battery cell 120 according to the present exemplary embodiment includes an electrode assembly 10, a case 15 containing the electrode assembly 10, and a cap assembly 50 sealing the case 15. The cap assembly 50 includes a cap plate 28 coupled to the opening of the case 15, a first terminal 21 electrically connected to the first electrode 11 and a second terminal 22 electrically connected to the second electrode 12.

The cap plate 28 is a thin plate and has a short-circuit hole 25.

A first tab 52 is electrically connected to the first terminal 21 and located above the short-circuit hole 25. A second tab 56 is electrically connected to the second terminal 22 and located above the short-circuit hole 25.

The first tab 52 and the second tab 56 are spaced apart and above, but not directly in contact with, the cap plate 28.

An deformable plate 51 is provided under the short-circuit hole 25, and an intermediate member 53 is welded and fixed to the deformable plate 51.

The intermediate member 53 is welded and fixed to the deformable plate 51 near a circumference of the deformable plate 51, and is thicker than the deformable plate 51.

When the internal pressure of rechargeable battery 120 is increased, the deformable plate 51 deforms and curves upward toward the exterior of the battery, lifting the intermediate member 53.

The lifted intermediate member 53 electrically connects the first tab 52 and the second tab 56, inducing a short-circuit.

Therefore, according to the present exemplary embodiment, explosion of the battery due to an excessive increase in internal pressure may be prevented by electrically connecting the first and second tabs 52 and 56, short circuiting the battery. The present exemplary embodiment may also reduce excessive heat buildup in the rechargeable battery 120 due to the short-circuit, as the tabs 52 and 56 are outside the case 15. Overheat of the cap plate 28 may also be reduced as current is not passed through the cap plate 28.

In addition, as the first tab 52 and the second tab 56 are both located outside the case, heat may be easily released to the surroundings through the first tab 52 and the second tab 56. This may prevent the electrolyte solution from igniting, as the tabs are spaced apart from the electrolyte solution.

Figure 4:
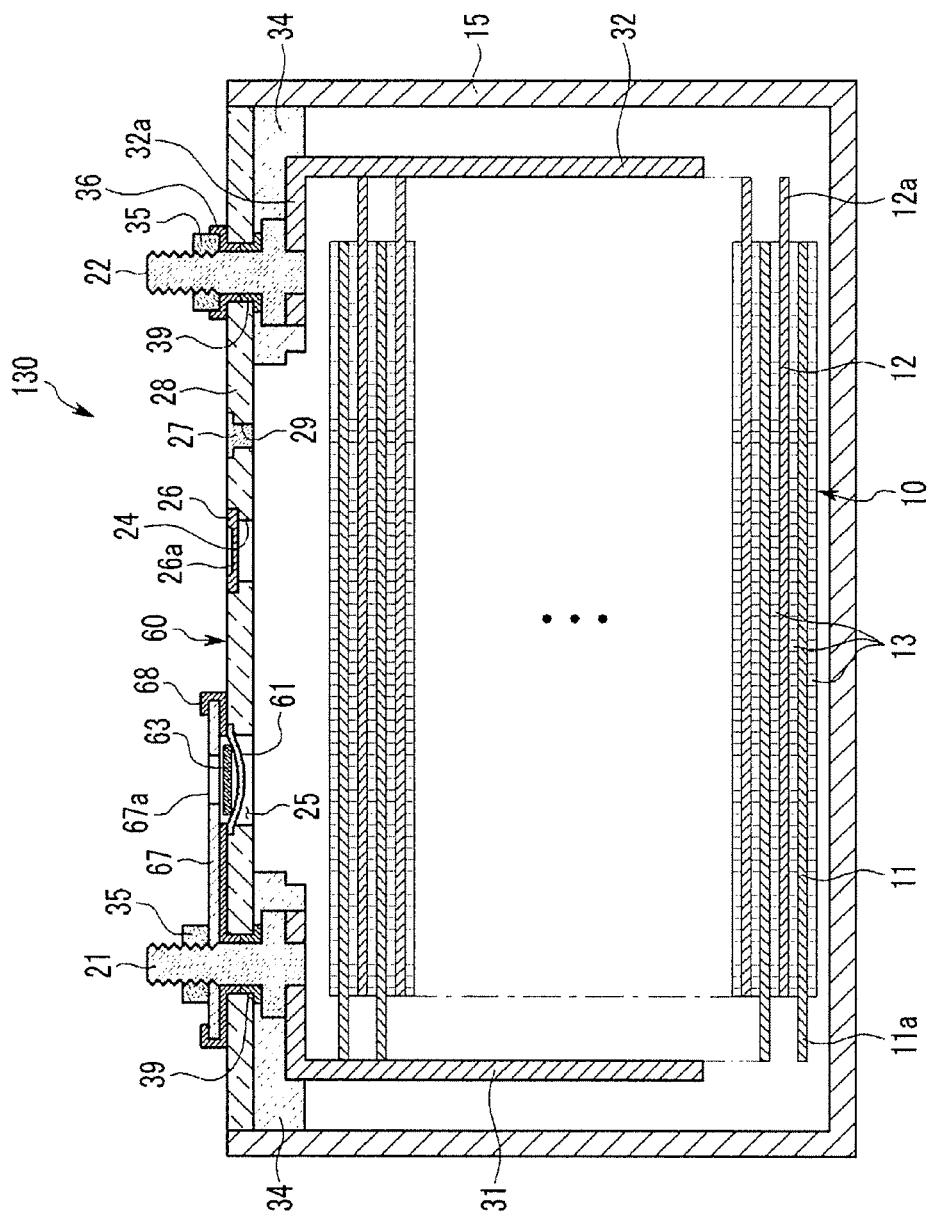
FIG. 4 is a cross-sectional view of a rechargeable battery according to a third embodiment of the present invention.

FIG. 4 is a cross-sectional view of a rechargeable battery according to a third embodiment of the present invention.

The rechargeable battery 130 according to the third exemplary embodiment includes an electrode assembly 10, a case containing the electrode assembly 10, and a cap assembly 60 sealing the case 15. The cap assembly 60 includes a cap plate 28 coupled to an opening of case 15, a first terminal 21 electrically connected to the first electrode 11, and a second terminal 22 electrically connected to the second electrode 12.

The cap plate 28 is a thin plate and has a short-circuit hole 25.

A first tab 67 located above the short-circuit hole 25 is electrically connected with the first terminal 21.

The first tab 67 has a plate shape and is located above the cap plate 28. The first terminal 21 is inserted in the hole of first tab 67 and fixed by a nut 35, thus joining the first tab 67 with the first terminal 21. Thereby, the first tab 67 is electrically connected to the first terminal 21 through a nut 35.

A conductive connection tab 36 is formed between the second terminal 22 and the nut 35. The conductive connection tab 36 electrically connects the second terminal 22 and the cap plate 28. A second terminal 22 is inserted in a hole of conductive connection tab 36. The conductive connection tab 36 is fastened to the cap plate 28 with a nut 35. According to the present exemplary embodiment, the cap plate 28 becomes a second tab.

An upper insulation member 68 is formed between the first tab 67 and the cap plate 28 to insulate the first tab 67 from the cap plate 28. A part of upper insulation member 68 surrounds a part of the first terminal 21, and other parts of the upper insulation member 68 are wrapped around the ends of the tab 67. The first tab 67 is stably supported by the upper insulation member 67, thus deformation of the first tab 67 is minimized or reduced even when it is contacted by the deformed deformable plate 61.

In addition, a circular vent 67a is formed in the first tab above the short-circuit hole 25. A corresponding hole is formed in the upper insulation member 68 above the short-circuit hole 25.

An deformable plate 61 is provided above the short-circuit hole 25 and fiext to the cap plate 28. An intermediate member 63 is welded and fixed to the deformable plate 61. Thereby, the deformable plate 61 is electrically connected to the second electrode 12 through the cap plate 28.

The deformable plate 61 has the same general structure as in the first embodiment. The intermediate member 63 includes a material having a higher melting point than that of the deformable plate 61. The deformable plate 61 may be made of aluminum, stainless steel, or any other suitable material, while the intermediate member may be made of aluminum, stainless steel, copper, or any other suitable material. The intermediate member 63 has a disc shape. The intermediate member 63 is welded and fixed to the deformable plate 61 near a circumference of the deformable plate 61.

When the internal pressure of rechargeable battery 130 is increased, the deformable plate 61 is deformed to protrude out of the case and becomes convex, lifting the intermediate member 63 toward the upper side. The lifted intermediated member 63 induces a short-circuit by electrically connecting the first tab 67 and the cap plate 28, thereby preventing the rechargeable battery from exploding.

While this disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly comprising a first electrode, a second electrode, and a separator between the first electrode and the second electrode;
   a case containing the electrode assembly; and
   a cap assembly coupled to the case, the cap assembly comprising a cap plate, a first tab electrically coupled to the first electrode, a deformable plate, and an intermediate member attached to the deformable plate by a connecting bar,
   wherein the deformable plate is configured to deform in response to an increase in pressure inside the case and cause the intermediate member to electrically contact the first tab to electrically couple the first electrode and the second electrode, and wherein the deformable plate is directly connected to the cap plate.

2. The rechargeable battery of claim 1, wherein a material of the intermediate member has a higher melting point than a material of the deformable plate.

3. The rechargeable battery of claim 1, wherein the intermediate member comprises a material selected from the group consisting of aluminum, stainless steel, and copper, and the deformable plate comprises a material selected from the group consisting of aluminum and stainless steel.

4. The rechargeable battery of claim 1, wherein the intermediate member has a thickness greater than a thickness of the deformable plate.

5. The rechargeable battery of claim 1, wherein the intermediate member is between the first tab and the electrode assembly.

6. The rechargeable battery of claim 5, wherein the cap assembly further comprises a second tab electrically coupled to the second electrode, wherein the connecting bar is between an end of the first tab and an end of the second tab.

7. The rechargeable battery of claim 1, wherein the first tab is inside the case.

8. The rechargeable battery of claim 7, wherein the electrode assembly further comprises a first lead tab electrically connected to the first electrode, and the first tab is affixed to the first lead tab.

9. The rechargeable battery of claim 1, wherein the deformable plate is welded to the cap plate.

10. The rechargeable battery of claim 1, wherein the cap assembly further comprises an insulating member between the first tab and the cap plate for electrically insulating the first tab from the cap plate.

11. The rechargeable battery of claim 1, wherein the deformable plate is curved to protrude toward an inside of the case.

12. The rechargeable battery of claim 1, wherein the cap assembly further comprises a first terminal, a second terminal, and a second tab; and
   wherein the first tab is electrically connected to the first terminal, the second tab is electrically connected to the second terminal, and the deformable plate is configured to deform in response to an increase in pressure inside the case and cause the intermediate member to electrically connect the first tab and the second tab.

* * * * *